United States Patent [19]
Cox

[11] Patent Number: 5,040,517
[45] Date of Patent: Aug. 20, 1991

[54] CARBURETOR PREHEATER

[76] Inventor: Carl C. Cox, Rte. No. 4, Box 36, Galax, Va. 24333

[21] Appl. No.: 610,290

[22] Filed: Nov. 5, 1990

[51] Int. Cl.⁵ .................... F02M 33/00; F02B 51/00
[52] U.S. Cl. ................................. 123/545; 123/556; 261/144
[58] Field of Search ............... 123/556, 545, 543, 547, 123/552; 261/144, 151

[56] References Cited

U.S. PATENT DOCUMENTS

| | | | |
|---|---|---|---|
| 1,795,037 | 3/1931 | Portail | 123/545 |
| 4,502,955 | 3/1985 | Schaupp | 123/557 |
| 4,600,825 | 7/1986 | Blazejovsky | 123/557 |
| 4,754,742 | 7/1988 | Young | 123/556 |

*Primary Examiner*—Andrew M. Dolinar
*Assistant Examiner*—M. Macy

[57] ABSTRACT

A continuous hot air intake for carburetor and fuel injection supplied engines that regulates the temperature of air mixing with fuel that is mixed in the carburetor or fuel injector prior to introduction to the cylinders of the engine. The invention includes preferably a heater and associated filter located at the air intake side of the carburetor that is activated by circulating heated fluid contained within the engine cooling system. The heater, in preferred form, is conveniently sized and circular in configuration so as to encircle the filter positioned at the air intake side of the carburetor, however, a circular filter can be used to encircle the heater. The heater and filter are encompassed by a releasably securable cover to hold these components together and in place and to block the entry of dust, dirt or other invading elements.

17 Claims, 2 Drawing Sheets

CARBURETOR PREHEATER

BACKGROUND OF THE INVENTION

1. Field of the Invention

This invention relates to automotive engine economic and operational efficiencies and more particularly to an automotive accessory that regulates the temperature of air entering the carburetor of an automotive engine to eliminate carburetor malfunctions associated with inclement weather, improve fuel efficiency, and prevent stalling and overheating.

2. Description of the Prior Art

There are a number of devices that have been used to heat either air flowing to the carburetor of an automotive engine or fuel being directed to mix with that air. Some of these devices equip carburetors with special passages that carry hot exhaust gases therearound so that the area surrounding the throttle plate of the carburetor is heated. Another technique that has been utilized in the past is to provide a water jacket for the carburetor which is connected to the cooling system of the vehicle.

Most of the prior art devices require a rather major redesign of the carburetor itself or the addition of expensive and highly technical and complicated elements which require considerable attention to assure operability. Moreover, the installation of such devices often require a rather significant modification to the engine of an automobile which cannot be returned to its original condition without expensive redesign.

From the foregoing, there is perceived a need for an inexpensive and efficient automotive accessory that will regulate the temperature of air entering the carburetor so as to eliminate carburetor freeze-ups associated with cold weather and high humidity conditions, improve fuel efficiency by allowing the engine to operate at peak performance, prevent engine stalling in winter and overheating in summer, and enable a do-it-yourself individual to install the improvement as a kit.

SUMMARY OF THE INVENTION

The present invention is an improvement in an automobile fuel system and the cooperating engine cooling system which regulates the temperature of air entering the carburetor and the air/fuel mixture achieved in the carburetor and thereafter is introduced to the cylinders of the engine for combustion. It includes, in its broadest form, a coil, circular in configuration and having fluid passage channels therein, which surrounds the filter that is positioned at the air intake side of the carburetor. A circular cover substantially encompasses the coil and the encircled filter and is secured in place by suitable releasably securing means. The coil and its associated elements are releasably fastened at the air intake side of the carburetor so that air entering the air intake side of the carburetor is warmed by the heater. The location of these elements, hereafter referred to as a preheater, also ensures that the warmed air which is subsequently mixed with fuel from the float chamber of the carburetor is together made a more efficient combination that is directed to the cylinders for combustion.

BRIEF DESCRIPTION OF THE DRAWINGS

Objectives and features of the present invention will become apparent from the foregoing detailed description taken in conjunction with the accompanying drawings wherein like characters of reference designate like parts throughout the several views, which drawings disclose at least one embodiment of the invention. It is to be understood, however, that the drawings are designed for the purpose of illustration only and are not intended as a definition of the limits of the invention.

DETAILED DESCRIPTION OF THE PREFERRED EMBODIMENT

Figure 1:
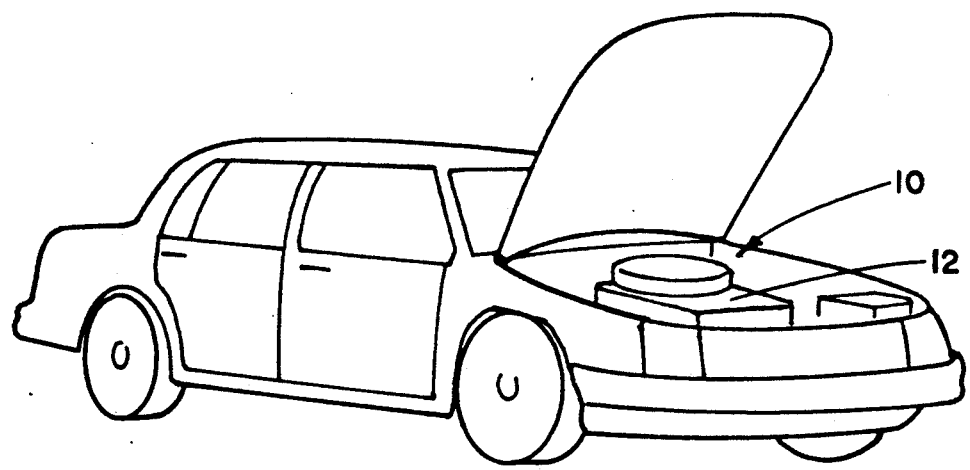
FIG. 1 is a perspective and fragmented view of an automobile whose engine has been provided with the present invention.

The present invention is an automotive accessory that regulates the temperature of air entering the carburetor. To appreciate the significance of the present invention, it is necessary to clarify the operation of the basic machine to which this invention applies. The invention applies to an internal combustion engine which utilizes a carburetor or a fuel injection system.

An internal combustion engine is one in which the fuel is burned within the engine itself. Upon being burned, the fuel combines with the oxygen of the air and becomes gas. The gas is a volume hundreds of times as great as the fuel from which it came, and the increasing volume takes place in a split second. The expansive force of the hot gas is used to do the work of moving certain parts of the engine.

There are more gasoline-fuel internal-combustion engines than any other kind of engine. All but a very small number of passenger automobiles, all small and medium-sized trucks, and many of the larger trucks are powered by gasoline engines; so are most lawn mowers, tractors and small motorboats, as well as all motorcycles and minibikes.

A common fuel, usually gasoline, is stored in the fuel, or gas tank, which usually is at the rear of the automobile. A thin pipe, the fuel line, runs from the tank to a pump. This fuel pump is needed to make sure that fuel moves from the gas tank, regardless of the position of the car or direction in which it is moving. A second length of fuel line runs from the pump to the engine.

The engine does not burn pure gasoline, but a mixture of gasoline and air. More precisely, what burns is a mixture of gasoline and the oxygen it makes up 1/5 of the volume of the air. The air enters the engine through an air filter, or air cleaner, which consists of a wide, flat metal can with holes through which air can enter. Inside the can is a thick, removable ring made of layers of chemically treated paper put together to form a large number of very small tubes. When air passes through the tubes, most of the dust from the air clings to the paper. This is an important function, because most of the dust in the air consists of small particles of quartz, a material actually harder than the metals of which an automobile engine is made. If dust were not first filtered out, it would act like sandpaper and rapidly wear down the moving parts of the engine.

A second type of air cleaner, one that is used on most European automobiles, consists of a wide flat can, on the bottom of which is a quarter-inch deposit of oil. Air entering the cleaner is broken up into a stream of small bubbles. The dust in the air bubbles sticks to the oil, allowing clean air to enter the engine.

The proper mixture of fuel and air is obtained by means of a carburetor which consists of two main parts. One part is the float chamber, which is usually about half full of gasoline and contains a hollow metal can, or float. An extension reaching from an upper edge of the float to an opening in the top of a chamber forms the fuel intake valve. This valve lets into the chamber more or less gasoline, depending upon the demand of the engine for fuel. When increased demand lessens the amount of gasoline in the float chamber, the float moves downward along with the lowering level of the gasoline. This opens the fuel intake valve, letting into the chamber more gasoline from the gas tank. The incoming gasoline raises the level of the fuel in the float chamber, causing the float to move upward and close the fuel intake valve. Thus the fuel-operated intake valve works automatically, constantly keeping the amount of fuel in the float chamber at about the same level.

From the float chamber, gasoline goes to the second main part of the carburetor, the barrel. This is a thick-walled metal pipe, more than an inch in diameter, in which the mixing of air and fuel takes place. A little more than a third of the distance from the upper end, the inside of the barrel narrows, then tapers back to its original width. A tube having such a shape is called a *venturi*. When air rushes through a venturi, a decrease in air pressure takes place at the narrowest point. At this point is the nozzle opening of a narrow tube that leads upward at a thirty-degree angle from the float chamber.

Air that has passed through the air filter rushes into the barrel of the carburetor. At the narrowed part of the venturi, the pressure of the air is decreased. Atmospheric pressure pushes gasoline out of the float chamber, up the narrow tube, and into the stream of air. As a result, the gasoline is broken up into small droplets and mixes with the air. This mixture moves rapidly out the bottom of the carburetor on its way to the cylinders.

The amount of gasoline-and-air mixture passing through the carburetor is increased or decreased by the positioning of a flat disc in the lower part of the venturi tube. The disc is known as the intake throttle valve. When the disc is at a right angle to the direction of the flow of the air-fuel mixture, the carburetor is closed, allowing none of the mixture to pass. When the driver of the car pushes down on the accelerator pedal with his foot, he or she turns the intake throttle so that more of the air-fuel mixture can go through the carburetor. When the driver lets up on the accelerator, a spring automatically turns the throttle valve, so that it is almost closed.

In some types of gasoline engines, fuel and air are mixed without the use of a carburetor. Instead, a system of fuel injection is used. In this system, air is forced into the cylinder (the part of the engine in which the fuel burned), and then the fuel is squirted, or injected, into the cylinder. The carburetor and the fuel-injection system each has its advantages. Manufacturers of automobiles in the United States use the carburetor in their engines almost exclusively.

On engines that use carburetors, the air-gasoline mixture goes from the lower part of the carburetor to the engine through a wide pipe called the intake manifold. The manifold has bracing pipes which connect with each cylinder of the engine.

The number of cylinders in gasoline engines usually vary from one to twelve, although 16-cylinder engines have been made. The present invention can be used in any application where engine cooling is accomplished by fluid means. Therefore, lawn mowers, minibikes, motocycles and the like that utilize liquid cooled systems may all be served by the present invention.

Referring now to the drawings and particularly to FIG. 1, the automotive accessory that regulates the temperature of air entering the carburetor or fuel injection system is shown associated with the car in FIG. 1 and generally designated as 10. It is positioned on top of the engine block 12 in a manner subsequently to be described. For convenience in the following detailed description, the inventive concept will be referred to as a *carburetor preheater*.

Figure 2:
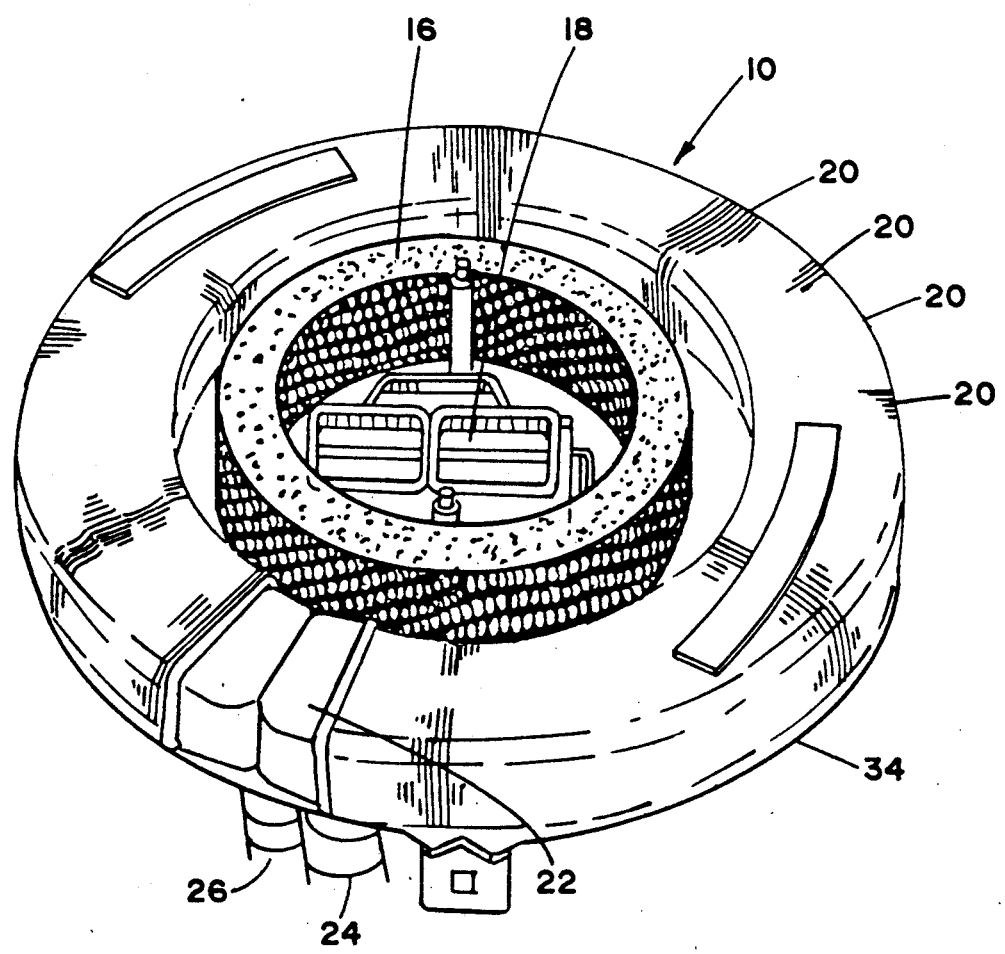
FIG. 2 is a perspective and isolated view of the preheater comprising a part of the present invention which is encircling a filter located at the air intake side of the carburetor in which the cover has been removed.
Figure 3:
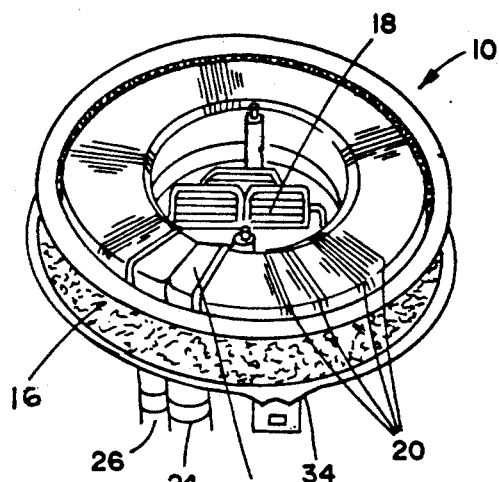
FIG. 3 is an alternative embodiment of the present invention in which the heater is positioned within the circle formed by an encircling filter.

FIG. 2 discloses the most essential element of the present invention to be a coil, generally designated as 10, circular in configuration, and totally encompassing an air filter 16 encircling the air intake portion of a carburetor 18. The coil closely follows the configuration of filter 16 and is provided for heat efficiency with a plurality of fins 20. The preheater 10 has fluid passage means comprising one or more fluid passage tubes 22 extending throughout so that fluid may pass through the entire length of the coil when introduced at, for example, entry 24. It then flows through coils 22 and leaves at exit 26. Thus preheater 10 effectively functions to provide a warm area for air entering the intake side 18 of the carburetor and also warms the atomized combination of fuel with the warmed air as the mixture is introduced to the combustion chambers of the engine.

Figure 6:
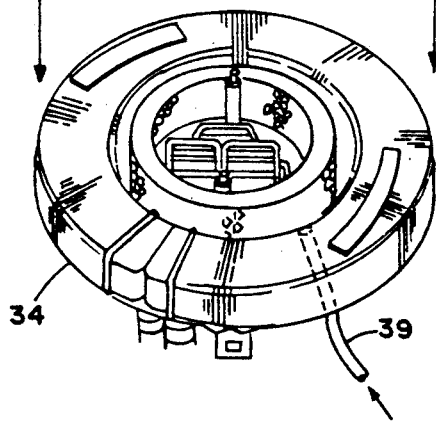
FIG. 6 is a diagrammatic view of the cooling system of an automotive vehicle showing the connection of the carburetor preheater disclosed herein within the cooling system and the crossover connection that bypasses the passenger heater to maximize the efficiency of the present inventive concept during summer months when the heater is not needed.

The heating of preheater 10 is accomplished by positioning the preheater in a fluid circulating mode in the cooling system of the automotive engine. Reference is made to FIG. 6 in which the carburetor preheater 10 is shown to be series-positioned within the cooling system circulatory arrangement so that fluid circulating through the block of the engine to dissipate its heat is circulated through the carburetor preheater 10, then continues through the passenger heater located within the interior of the automobile through the radiator (not shown), and then returns to the input side of the engine. The total objective of the cooling system is to remove heat from the engine and dissipate it through the radiator; however, other functions are served such as heating the interior of the automobile during colder months when such heat is needed.

In the present invention, it is found to be more efficient to bypass the passenger heater section with a bypass fluid connector 28 so that no efficiency loss is encountered when the passenger heater is not being used during summer months.

Figure 5:
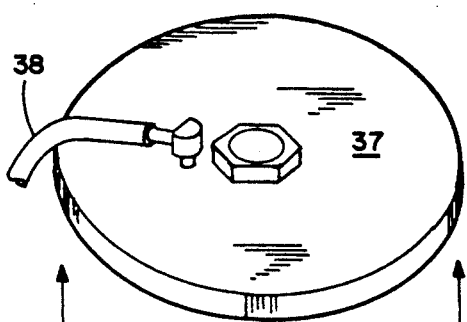
FIG. 5 is an alternative embodiment of the invention shown in FIG. 3 in an exploded illustration in which fumes from the engine are introduced to the preheater through the cover.
Figure 5:
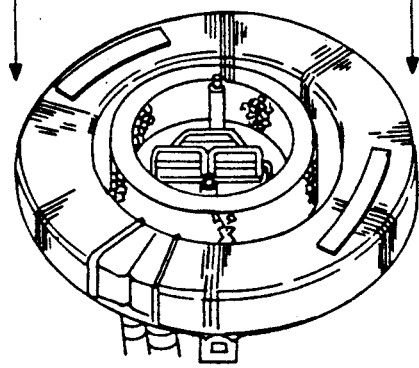
Figure 4:
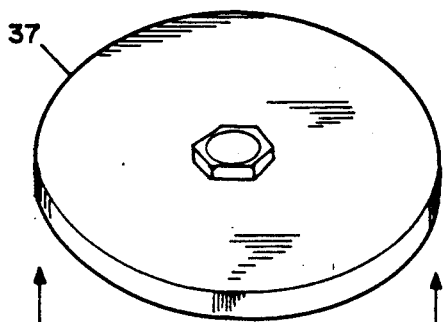
FIG. 4 is a perspective and exploded view of the preheater comprising the present invention encircling an air filter which has its cover isolated for a better view of the internal arrangement and which has fumes from the engine introduced underneath the heater and filter combination.

The present invention is particularly adaptable for those individuals who can install such units on conventional automobile engines. Kits including the present invention can be customed to accommodate carburetor openings in any conventional automobile with minor adjustments by using heat resistant adapters. These heat resistant adapters can be installed by modifying the bottom plate 34 on which preheater 10 is situated. Recirculated fumes from inside the valve cover can be directed back into the carburetor through the top 37 (FIG. 5) or through a lower air input tube 39 joining the bottom plate 34 as shown in FIG. 4.

Fastening the present invention to the existing engine arrangement depends on the model of the car involved and the particular configuration of the engine block. A kit containing the present invention for do-it-yourselfers can easily include all various elements for adapting the kit to different engine configurations. It is well within the ability of those skilled in the art to utilize various shims, supports, braces and the like to utilize the present invention on any conventionally known automobile.

While most conventional carburetors utilize gasoline broken up into small droplets and mixed with air, the present invention will cause such conventional carburetors to be more fuel efficient because the preheater can be used to heat the fuel thereby creating some vapor with both the fuel and fuel vapor mixture being introduced to the engine instead of gasoline droplets alone.

The present invention is particularly helpful when applied to older model vehicles with high mileage which have, perhaps, commenced to burn some oil during their regular operation. The preheater will enable combustion of this oil gas mixture so that the oil will burn more efficiently and will reduce the noticeable blue smoke normally associated with oil combustion. The more efficient combustion achieved by use of the present invention will, of course, have a favorable environmental impact since pollutants arising from burning oil will be significantly reduced. Obviously a lower grade of fuel may be used which will reduce operating costs.

Figure 7:
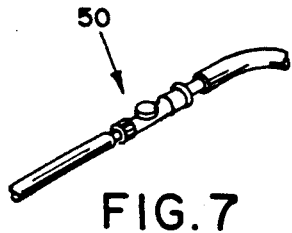
FIG. 7 is a flow control valve used to regulate fluid passing through the preheater and thereby control the temperature of air entering the carburetor.

A flow control valve generally designated 50 and illustrated in FIG. 7 must be installed at the highest point 52 of crossover hose 28 between the two tees 56,58. The flow control valve will regulate the gas boiling in the carburetor which will enable the reduction of coolant flow to the preheater. The flow control valve can also be used to cut the flow of fluid through the preheater entirely to allow those skilled in the art to make adjustments necessary for fine tuning the engine operation.

Although one or more embodiments have been shown and described in detail, it will be obvious to those having ordinary skill in the art that the details of construction of these particular embodiments (including the configuration of the preheater) may be modified in a great many ways without departing from the unique concept presented. It is therefore intended that the invention be limited only by the scope of the appended claims rather than by particular details of construction shown except as specifically stated in the claims.

The embodiments of the invention in which an exclusive property or privilege is claimed are defined as follows.

What is claimed is:

1. A carburetor preheater for use with an automotive fuel and heating system having an engine, a carburetor, a filter, a fuel supply, a fuel pump and fuel lines, said preheater comprising a coil adjacent the filter and having fluid passage means therein; fluid lines connecting said fluid passage means to the automotive heating system; a cover to substantially enclose said coil; means releasably securing said cover with said coil; and means securing said coil and cover around the filter.

2. The preheater as claimed in claim 1 wherein said coil is substantially circular.

3. The preheater as claimed in claim 1 wherein said coil carries a plurality of heat transfer fins.

4. The preheater as claimed in claim 2 wherein said coil carries a plurality of heat transfer fins.

5. The preheater as claimed in claim 1 further comprising crossover means for connection with the automotive heating system to maximize flow through said fluid passage means when the automobile passenger heater is off.

6. The preheater as claimed in claim 4 further comprising crossover means for connection with the automotive heating system to maximize flow through said fluid passage means when the automobile passenger heater is off.

7. In an automotive fuel and fluid circulatory system, the fuel system having a filter, a carburetor, a fuel pump, a fuel source, fuel lines and the fluid circulatory system having fluid lines connecting a radiator, an engine cooling section and a passenger heater, an improvement for a carburetor preheater, said preheater comprising: a coil adjacent the filter in position near the carburetor intake, said coil having fluid passage means therein; fluid lines connecting said fluid passage means within said fluid circulatory system so that heated fluid is selectively circulated through the coil fluid passage means; a cover substantially encompassing said coil; means releasably securing said cover to said coil; and means securing said coil and cover around the filter.

8. The preheater as claimed in claim 7 wherein said coil is substantially circular.

9. The preheater as claimed in claim 8 wherein said coil carries a plurality of heat transfer fins.

10. The preheater as claimed in claim 7 further comprising crossover means for connection with the automotive heating system to maximize flow through said fluid passage means when the automobile passenger heater is off.

11. The preheater as claimed in claim 10 wherein said coil carries a plurality of heat transfer fins.

12. The preheater as claimed in claim 10 further comprising air input means engaging said cover and directing airflow into the carburetor.

13. The preheater as claimed in claim 11 further comprising air input means engaging said cover and directing airflow into the carburetor.

14. In an automobile fuel and engine cooling system, the fuel system having a heat burning engine, a fuel supply, a fuel pump, a carburetor supplying a mixture of air and fuel to the engine, a filter filtering the air prior to its mixing with the fuel, and fuel lines connecting the fuel supply, the fuel pump and the carburetor, and the engine cooling system having fluid lines connecting the engine block, a radiator, and a passenger heater, the improvement comprising a carburetor preheater for regulating the temperature of air entering the carburetor, the preheater including: a circular heater surrounding the filter positioned at the air intake side of the carburetor, said heater having fluid passage means extending throughout and said fluid passage means connecting with fluid lines, the engine block, the radiator and the passenger heater to receive heated fluid and elevate the temperature of the air near said preheater, said filter and the air intake side of the carburetor; a cover substantially encompassing said coil and said filter; means releasably securing said cover over said coil and filter; and means releasably securing said coil around said filter proximate the air intake side of the carburetor whereby air entering the intake side of the carburetor is warmed by the heater to form a more combustion efficient fuel/air mixture directed to the automobile engine.

15. The preheater as claimed in claim 14 wherein said coil carries a plurality of heat transfer fins.

16. The preheater as claimed in claim 15 further comprising crossover means for connection with the automotive heating system to maximize flow through said fluid passage means when the automobile passenger heater is inactive.

17. The preheater as claimed in claim 7 further comprising a flow control valve associated with said fluid lines operable to regulate the flow of fluid therein and thereby control the temperature of fuel in the carburetor.

* * * * *